US008023217B1

(12) United States Patent
Pinvidic et al.

(10) Patent No.: US 8,023,217 B1
(45) Date of Patent: *Sep. 20, 2011

(54) METHOD AND SYSTEM FOR READ GATE TIMING CONTROL FOR STORAGE CONTROLLERS

(75) Inventors: Daniel R. Pinvidic, San Juan Capistrano, CA (US); Wayne C. Datwyler, Mission Viejo, CA (US); Hunardi Hudiono, Laguna Niguel, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,875

(22) Filed: Oct. 22, 2009

Related U.S. Application Data

(63) Continuation of application No. 11/099,746, filed on Apr. 6, 2005, now Pat. No. 7,609,468.

(51) Int. Cl.
*G11B 5/09* (2006.01)
(52) U.S. Cl. ........................................................ 360/51
(58) Field of Classification Search .................. None
See application file for complete search history.

(56) References Cited

U.S. PATENT DOCUMENTS

| | | | |
|---|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole et al. |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 pages.

(Continued)

*Primary Examiner* — Daniell L Negron

(57) ABSTRACT

A device includes a data path configured to transfer data from a read channel device to a host. A read gate delay module is configured to receive a first read gate signal, to output a second read gate signal to the read channel device based on the first read gate signal, and selectively delay a transition of the second read gate signal between an asserted state and a non-asserted state based on a data sector size of a data segment and positive and negative edges of a write clock.

17 Claims, 5 Drawing Sheets

U.S. PATENT DOCUMENTS

| | | |
|---|---|---|
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson et al. |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,592,404 A | 1/1997 | Zook |
| 5,600,662 A | 2/1997 | Zook |
| 5,602,857 A | 2/1997 | Zook et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,718 A | 3/1998 | Au |
| 5,740,466 A | 4/1998 | Geldman et al. |
| 5,745,793 A | 4/1998 | Atsatt et al. |
| 5,754,759 A | 5/1998 | Clarke et al. |
| 5,758,188 A | 5/1998 | Appelbaum et al. |
| 5,784,569 A | 7/1998 | Miller et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |
| 6,094,320 A | 7/2000 | Ahn |
| 6,124,994 A | 9/2000 | Malone, Sr. |
| 6,134,063 A | 10/2000 | Weston-Lewis et al. |
| 6,157,984 A | 12/2000 | Fisher et al. |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |
| 6,330,626 B1 | 12/2001 | Dennin et al. |
| 6,381,659 B2 | 4/2002 | Proch et al. |
| 6,401,149 B1 | 6/2002 | Dennin et al. |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,526,476 B2 | 2/2003 | Wilson et al. |
| 6,530,000 B1 | 3/2003 | Krantz et al. |
| 6,574,676 B1 | 6/2003 | Megiddo |
| 6,662,334 B1 | 12/2003 | Stenfort |
| 6,717,763 B2 | 4/2004 | Ottesen et al. |
| 6,826,650 B1 | 11/2004 | Krantz et al. |
| 6,915,416 B2 | 7/2005 | Deng et al. |
| 7,199,954 B2 * | 4/2007 | Lee et al. .................. 360/39 |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blahut R. Digital Transmission of Information (Dec. 4, 1990), pp. 429-430.

Hwang, Kai and Briggs, Faye A., "Computer Architecture and Parallel Processing" pp. 156-164, (published 1984).

Zeidman, Bob, "Interleaving DRAMS for Faster Access", System Design ASIC & EDA, pp. 24-34 (Nov. 1993).

P.M. Bland et al. Shared Storage Bus Circuitry, IBM Technical Disclosure Bulletin, vol. 25, No. 4, Sep. 1982, pp. 2223-2224.

PCT Search Report for PCT/US00/07780 mailed Aug. 2, 2000, 4 pages.

PCT Search Report for PCT/US01/22404, mailed Jan. 29, 2003, 4 pages.

* cited by examiner

METHOD AND SYSTEM FOR READ GATE TIMING CONTROL FOR STORAGE CONTROLLERS

CROSS-REFERENCE TO RELATED APPLICATIONS

This application is a continuation of U.S. patent application Ser. No. 11/099,746, filed Apr. 6, 2005, the disclosure thereof incorporated by reference herein in its entirety.

FIELD OF THE INVENTION

The present invention relates generally to storage device controllers, and more particularly, to controlling read gate timing for hard disk controllers.

BACKGROUND

Conventional computer systems typically include several functional components. These components may include a central processing unit (CPU), main memory, input/output ("I/O") devices, and storage devices (for example, disk driver, tape drives) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

A storage device is typically coupled to the host system via a controller that handles complex details of interfacing the storage device to the host system. The controller performs numerous functions, for example, converting digital to analog data signals, disk formatting, error checking and fixing, logical to physical address mapping and data buffering. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory. Buffer memory may be a Synchronous Dynamic Random access Memory ("SDRAM"), or Double Data Rate-Synchronous Dynamic Random Access Memory (referred to as "DDR").

Typically, a disk drive (or storage device, used interchangeably) includes one or more magnetic disks. Each disk (or platter) typically has a number of concentric rings or tracks (platter) on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding with a read or write operation. Data is accessed serially; one bit at a time and typically, each disk has its own read/write head.

To access data from a disk drive (or to write data), the host system must know where to read (or write data to) the data from the disk drive. A driver typically performs this task. Once the disk drive address is known, the address is translated to cylinder, head and sector, based on platter geometry and sent to the disk controller. Logic on the hard disk looks at the number of cylinders requested. Servo controller firmware instructs motor control hardware to move read/write heads to the appropriate track. When the head is in the correct position, it reads the data from the correct track.

Typically, a read and write head has a write core for writing data in a data region, and a read core for magnetically detecting the data written in the data region of a track and a servo pattern recorded on a servo region. A servo system detects the position of the head on a platter according to the phase of a servo pattern detected by the read core of the head. The servo system then moves the head to the target position.

A servo controller in the servo system communicates with a data recovery device. One such device is the "read channel device". An example of such a product is "88C7500 Integrated Read channel" device sold by Marvell Semiconductor Inc®. The read channel device is coupled to the controller and the disk drive.

A read gate ("RG") signal is sent to the read channel device to control data read operations. The RG signal is asserted and de-asserted at a certain time, based on the code word encoding method used by the Read Channel device. In a conventional system, the RG signal is asserted/de-asserted on a specific code word boundary (for example, "mod 6" boundary i.e. at multiples of six symbols) of the write clock. However sector sizes continue to change and conventional systems, instead of precisely controlling the assertion/de-assertion of the RG signal to allow partial code word operations, sacrifice storage media utilization by padding the data stream with additional symbols of zero to reach a full code word boundary where RG is de-asserted.

Therefore, there is a need for a system and method for efficiently controlling the assertion/de-assertion of RG signals, which improves storage media utilization.

SUMMARY OF THE INVENTION

In one aspect of the present invention, a disk controller that controls data transfer between a storage device and a host system is provided. The disk controller includes logic having a state machine that controls de-assertion of a read gate signal based on sector size and/or whether a data segment is split or non-split. The read gate signal is de-asserted at programmable times, based on data sector size.

The state machine interfaces with a register whose settings indicate to the state machine that next time when the state machine starts executing from an idle state it should process a second half of a split sector. The state machine also uses a register that to extend assertion of the read gate signal. It is noteworthy that the read gate signal is controlled on a positive and negative edge of a write clock signal.

In another aspect of the present invention, a method for controlling the de-assertion of a read gate signal in disk controllers is provided. The method includes, operating a state machine in an idle state; examining a register value to determine if a data segment is split or non-split; and using a delay configuration if a data segment is split.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1A:
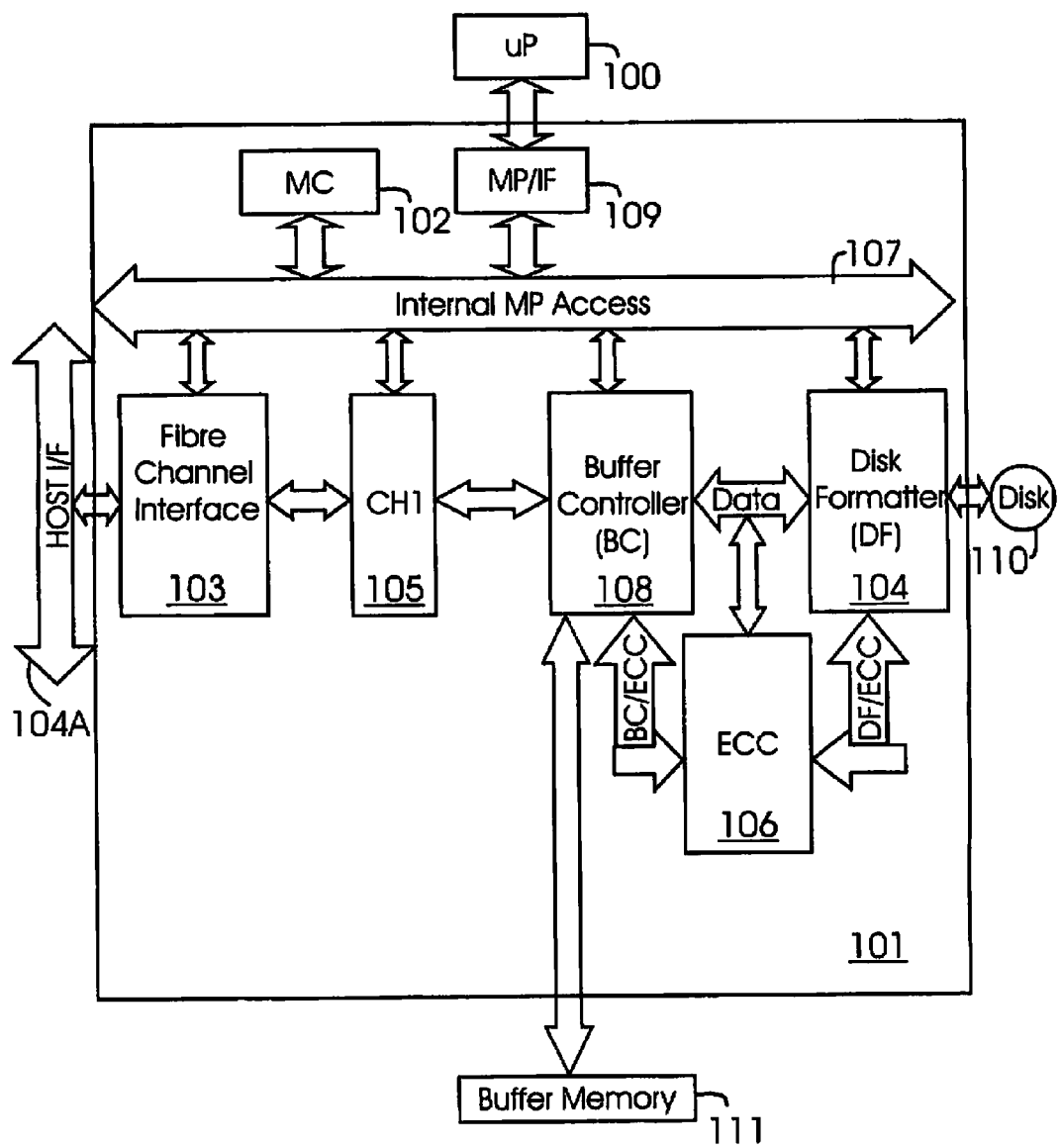
FIG. 1A is an example of a storage system, used according to one aspect of the present invention.

The system of FIG. 1A is an example of a storage system (with an optical disk or tape drive), included in (or coupled to) a computer system. The host computer (not shown) and the storage device 110 (also referred to herein as disk 110) communicate via a port using a disk formatter "DF" 104. Storage device 110 may be connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor 100. Interface 109 serves to couple microprocessor bus 107 to microprocessor 100 and a micro-controller ("MC) 102.

A read only memory ("ROM") omitted from the drawing is used to store firmware code executed by microprocessor 100. Fibre Channel interface 103 interfaces with host interface 104A and processes Fibre Channel frames.

Controller 101 can be an integrated circuit (IC) that comprises of various functional modules, which provide for the writing and reading of data stored on storage device 110. Microprocessor 100 is coupled to controller 101 via interface 109 to facilitate transfer of data, address, timing and control information.

Buffer memory 111 is coupled to controller 101 via ports to facilitate transfer of data, timing and address information. Buffer memory 111 may be a double data rate synchronous dynamic random access memory ("DDR-SDRAM") or synchronous dynamic random access memory ("SDRAM"), or any other type of memory.

Disk formatter 104 is connected to microprocessor bus 107 and to buffer controller 108. A direct memory access ("DMA") DMA interface (not shown) is connected to microprocessor bus 107 and to data and control port (not shown).

Buffer controller (also referred to as "BC") 108 connects buffer memory 111, channel one (CH1) 105, error correction code ("ECC") module 106 and to bus 107. Buffer controller 108 regulates data movement into and out of buffer memory 111.

Data flow between a host and disk passes through buffer memory 111. ECC module 106 generates the ECC that is saved on disk 110 writes and provides correction mask to BC 108 for disk 110 read operation.

Plural channels may be used to allow data flow. Channels (for example, channel 0 ("CH0") (not shown), CH1 105 and channel 2 ("CH2") (not shown)) are granted arbitration turns when they are allowed access to buffer memory 111 in high speed burst write or read for a certain number of clocks. The plural channels use first-in-first out ("FIFO") type memories to store data that is in transit.

Figure 1B:
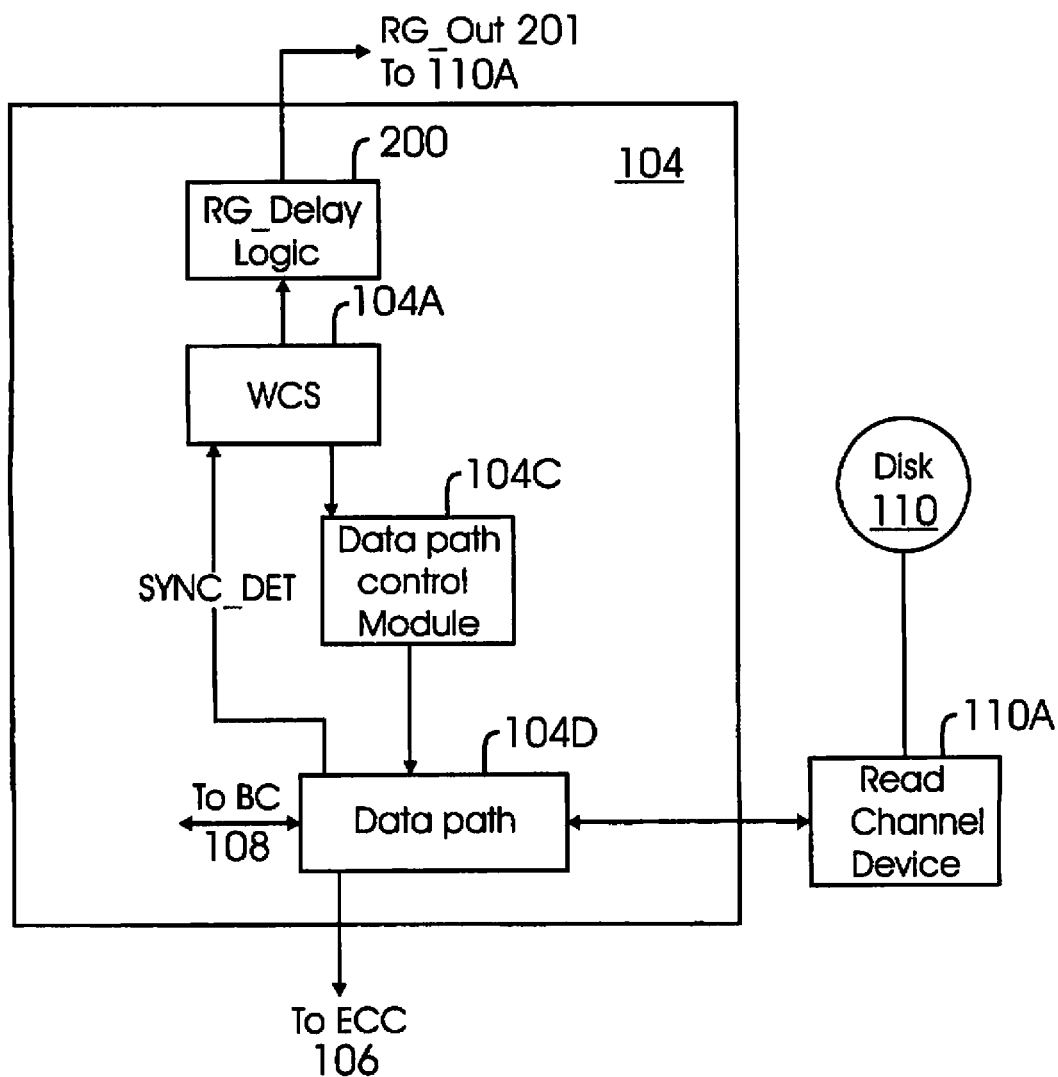
FIG. 1B shows a block diagram of a disk formatter used according to one aspect of the present invention.

FIG. 1B shows a block diagram of DF 104 having a write control state machine 104A ("shown as WCS 104A") that controls the write and read operation in disk 110 using a data path control module 104C. The data path is shown as 104D where data from DF 104 is sent to BC 108 and/or ECC module 106. Data path 104D receives data from read channel device 110A and then the data is sent to BC 108, before being sent to the host.

RG_Delay logic 200 (may also be referred to as logic 200) is used to generate a signal RG_Out 201 (may also be referred to as signal 201 that is sent to read channel device 110A. Signal 201 may be de-asserted on the falling and rising edge of the WR_CLK, shown as 211 in FIG. 2A and may be referred to as signal 211. Signal 211 is controlled by WCS 104A for the write operations. The de-assertion of signal 201 may be configured to accommodate different data sectors, for example, a split data sector or an un-split data sector.

Figure 2A:
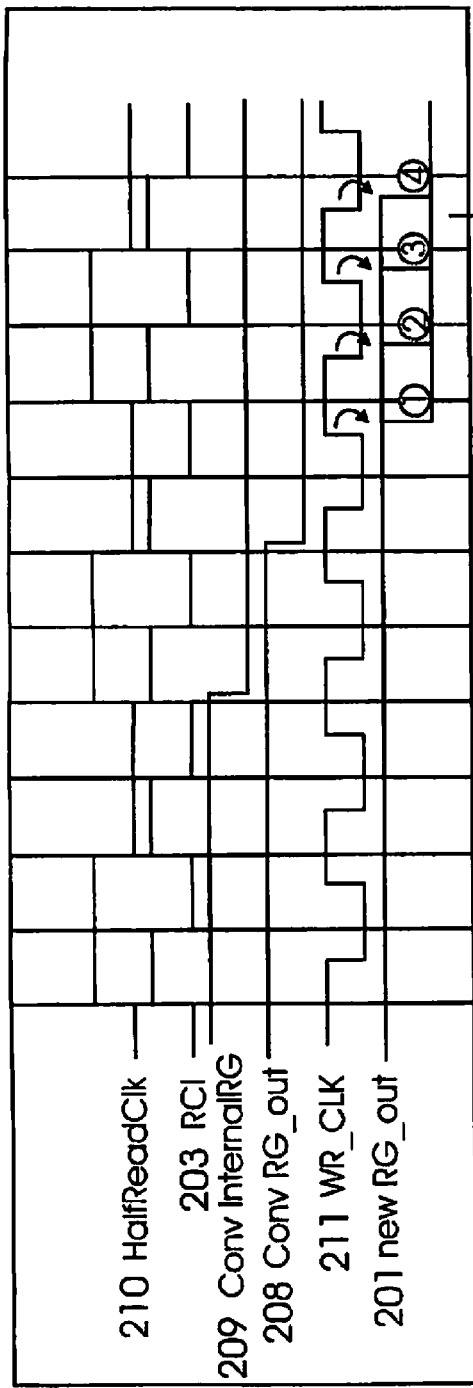
FIG. 2A is a timing diagram of various signals used according to one aspect of the present invention.
Figure 2B:
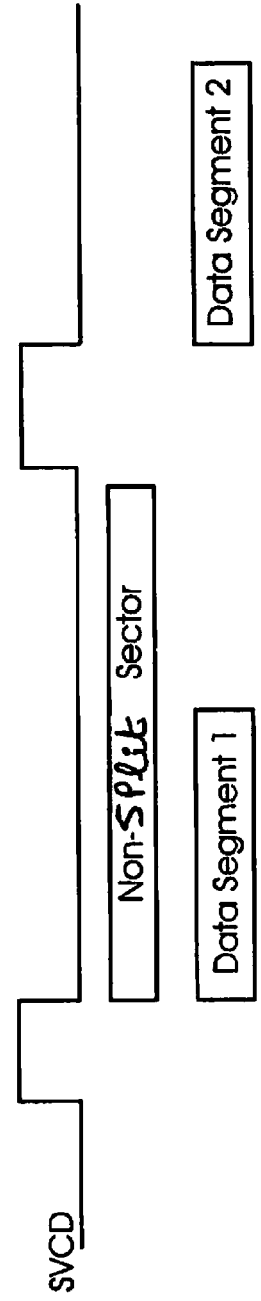
FIG. 2B shows an example of a split and non-split data sector used according to one aspect of the present invention.

FIG. 2B shows an example of a split and non-split data sector. Data segment 1 is the first segment of a data sector that is split between two sector pulses. Data segment 2 is the second portion of the data sector. The non-split data sector is read entirely between two sector pulses.

FIG. 2A shows a timing diagram of the various signals that are used according to one aspect of the present invention. The read clock is shown as 210, while the internal clock (RCI) for DF 104 is shown as 203. The conventional RG clocks are shown as 209 and 208. The write clock (WR_CLK) is shown as 211. Signal 201 is the read gate signal, which can be de-asserted at intervals 1, 2, 3 and 4. These intervals are chosen to accommodate varying sector sizes.

In conventional systems, signal 208 is de-asserted on the rising edge of signal 210, re-clocked at the next RCI 203 cycle and then sent out to a read channel device.

Figure 2C:
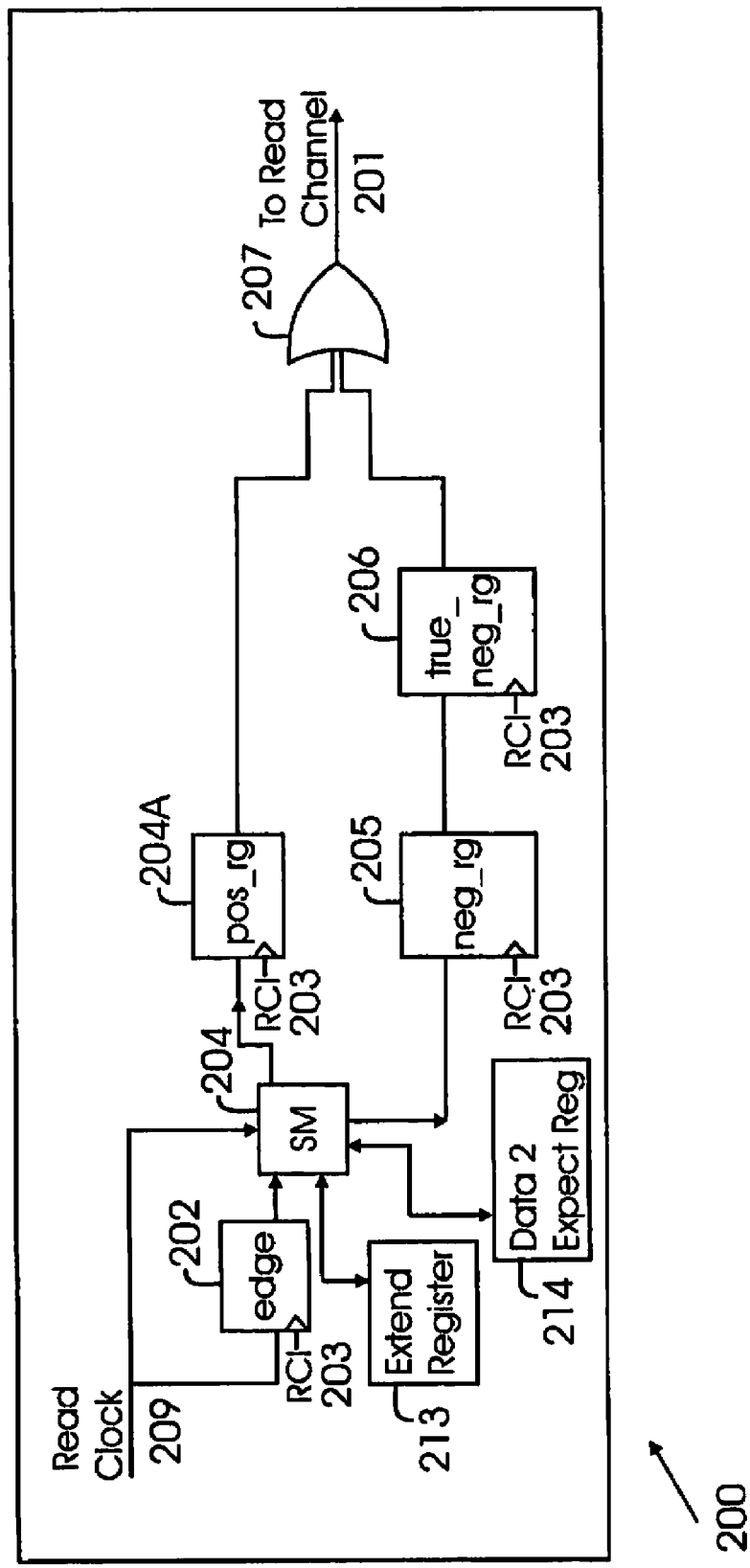
FIG. 2C shows a schematic of the logic, according to one aspect of the present invention.

Logic 200, described below with respect to FIG. 2C, according to one aspect of the present invention, allows signal 201 to be asserted at the four different intervals, 1, 2, 3 and 4 (as shown in FIG. 2A) based on data sector size. Signal 201 may be controlled at both the positive and negative edge of write clock 211.

Logic 200 includes a state machine 204 that controls when signal 201 should be de-asserted based on the sector size. Edge detection logic 202 that operates on clock 203 detects the falling edge of signal 209. The detected falling edge is monitored by state machine 204, which also receives signal 209. Outputs from registers 204A, 205 and 206 via logic 207 control the four de-assertion points shown in FIG. 2B. The inputs to registers 204A, 205 and 206 are controlled by state machine 204.

State machine 204 also interfaces with an extend register 213 (may be referred to as register 213) and a data2expect register 214 (may be referred to as register 214). Register 214 is used to indicate to state machine 204 that the next time it starts executing from IDLE (FIG. 3) it will load a value (shown as RGDelayData[1:0]) corresponding to the case when it is processing the second half of a split sector. Register 213 is used to extend the assertion of signal 209 as described below.

Figure 3:
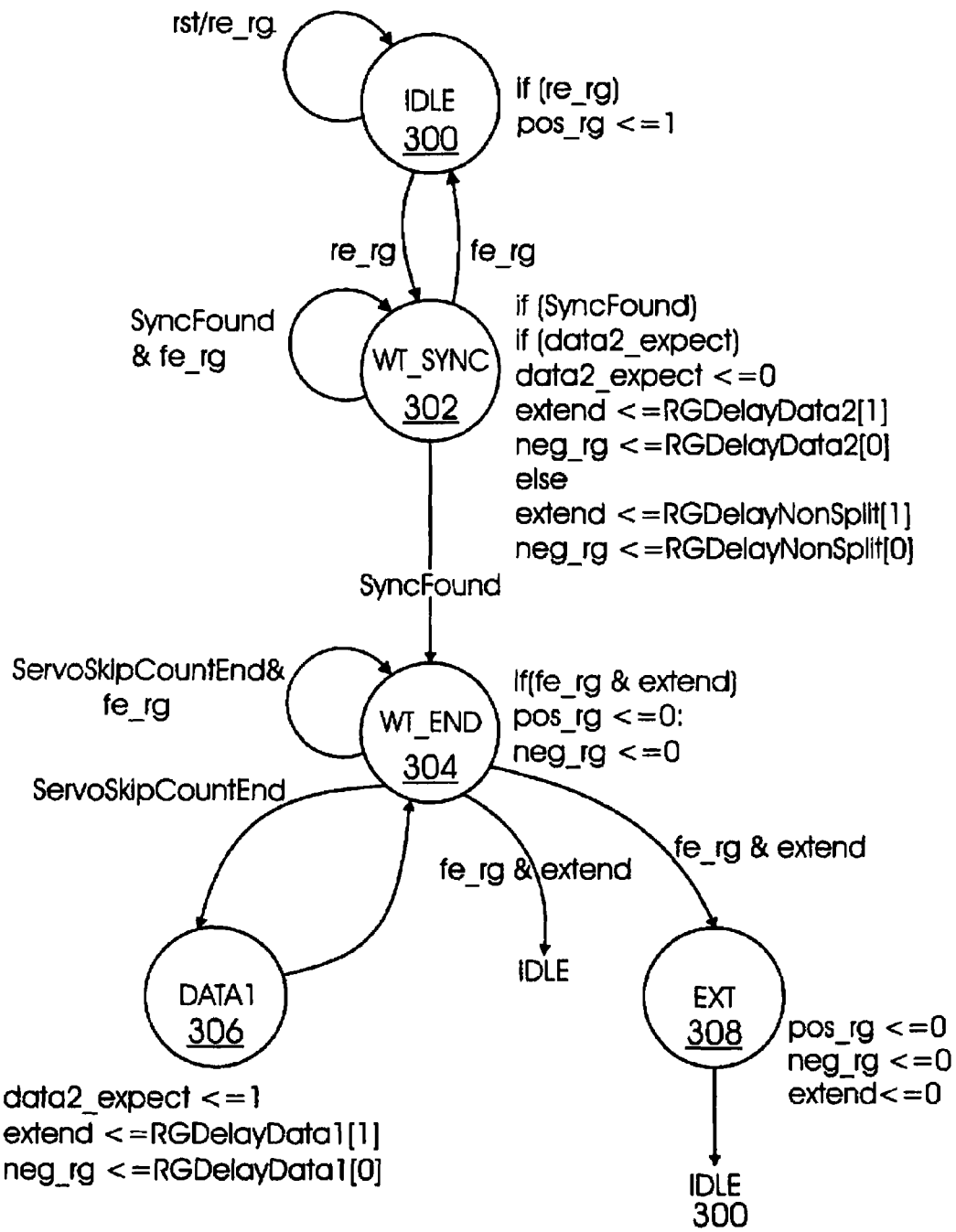
FIG. 3 shows a state machine diagram, used according to one aspect of the present invention.

FIG. 3 shows a state machine diagram of state machine 204 for controlling the de-assertion of signal 201, according to one aspect of the present invention. State 300 is an IDLE state for state machine 204. State machine 204 gets activated when signal 209 goes high. Register 204A is then set in anticipation of de-assertion of signal 201 on the rising edge of signal 203.

In state 302 (i.e. the WT_SYNC state), state machine 204 waits for the assertion of a SYNCFOUND signal (or command, used interchangeably throughout this specification), which indicates that data is being returned from disk 110. State machine 204 examines register 214 value and the programmable control bits from data wedge format table (not shown). Register 214 indicates to state machine 204 that the next time it starts executing from IDLE (State 300), it should load the RGDelayData[1:0] value from a Data Wedge Format Table (not shown) when it is processing the second half of a split sector. The loaded bits are: extend=RGDelaydata[1] and neg_rg=RGDelayData[0].

If register 214 is set to a certain value, for example 1, this indicates to state machine 204 that on a previous run, state machine 204 was processing data segment 1 (FIG. 2B) of a split data sector. Register 214 is set so that the next time the data is processed as data segment 2 of the split data sector. State machine 204 sets the extend register 213 and register 205 signals depending on the data2_expect case (i.e. data segment 1 or data segment 2). Register 213 causes the state machine 204 to extend the assertion of signal 209 by one more clock to accommodate situations 3 and 4 of FIG. 2A. Register 205 causes signal 201 to be de-asserted on the negative edge of the clock, i.e., timing cases 2 and 4 as shown in FIG. 2A.

When the SYNC Found (or SYNC DET) signal is asserted by DF 104, state machine 204 transitions to the WT_END state (shown as 304). During this state, state machine 204 waits for the assertion of a "Servo skip count End" signal from DF 104, which indicates that a sector will be split (as shown in FIG. 2B). This transitions the state machine 204 to the DATA1 state (shown as 306).

In the DATA1 state, state machine 204 uses the "RG Delay Data 1" configuration. This configuration is used when it has been determined that the data is a split sector, and these 2 bits are used to determine the amount of delay at the end of the DATA1 portion. Register 214 is also set so that the next time (i.e. for the second or subsequent data segment) the "RG Delay Data2 Configuration" is used. Register 213 and register 205 are set based on the RG Delay Data 1 configuration.

If the falling edge of 209 is seen, then the state of the extend register 213 is evaluated during state 304. If the extend register 213 value is false, then the state machine 204 goes to the IDLE state. If the extend register 213 value is true, then the state machine 204 transitions to the EXT state (shown as 308).

During the EXT state, state machine 204 turns off registers 204A, 205, 206 and extend signals, and then transitions to the IDLE state.

In one aspect of the present invention, read gate de-assertion varies based on sector size and whether a data segment is split. This allows data to be store more compactly without sacrificing any ECC bits.

Although the present invention has been described with reference to specific embodiments, these embodiments are illustrative only and not limiting. Many other applications and embodiments of the present invention will be apparent in light of this disclosure.

What is claimed is:

1. A device comprising:
    a data path configured to transfer data from a read channel device to a host; and
    a read gate delay module configured to
        receive a first read gate signal,
        output a second read gate signal to the read channel device based on the first read gate signal, and
        selectively delay a transition of the second read gate signal between an asserted state and a non-asserted state based on a data sector size of a data segment and in response to both positive and negative edges of a write clock.

2. The device of claim 1, wherein the read gate delay module is configured to output the second read gate signal further based on a disk formatter clock signal.

3. The device of claim 1, wherein the second read gate signal is configured to control read operations of the read channel device.

4. The device of claim 1, wherein the read gate delay module is configured to selectively delay the transition of the second read gate signal based on intervals corresponding to a time between the positive and negative edges of the write clock.

5. The device of claim 1, wherein the read gate delay module is configured to store data that indicates when the data segment is part of a split data sector.

6. The device of claim 1, wherein the read gate delay module is configured to store data that directs the read gate delay module to delay the transition of the second read gate signal.

7. The device of claim 1, wherein the read gate delay module is configured to store data to indicate an amount of time to delay the transitioning of the second read gate signal.

8. The device of claim 1, wherein the read gate delay module is configured to store data that directs the read gate delay module to transition the second read gate signal based on the negative edges of the write clock.

9. A storage controller comprising the device of claim 1.

10. A method comprising:
    receiving a first read gate signal;
    outputting a second read gate signal to a read channel device based on the first read gate signal;
    selectively delaying a transition of the second read gate signal between an asserted state and a non-asserted state based on a data sector size of a data segment and in response to both positive and negative edges of a write clock; and
    transferring data from a read channel device to a host based on the second read gate signal.

11. The method of claim 10, further comprising outputting the second read gate signal further based on a disk formatter clock signal.

12. The method of claim 10, wherein the second read gate signal controls read operations of the read channel device.

13. The method of claim 10, further comprising selectively delaying the transition of the second read gate signal based on intervals corresponding to a time between the positive and negative edges of the write clock.

14. The method of claim 10, further comprising storing data that indicates when the data segment is part of a split data sector.

15. The method of claim 10, further comprising storing data that directs a read gate delay module to delay the transition of the second read gate signal.

16. The method of claim 10, further comprising storing data that indicates an amount of time to delay the transition of the second read gate signal.

17. The method of claim 10, further comprising storing data that directs a read gate delay module to transition the second read gate signal based on negative edges of the write clock.

* * * * *